No. 867,296. PATENTED OCT. 1, 1907.
A. W. PARK.
HOG CATCHER.
APPLICATION FILED MAY 15, 1907.

Witnesses
Phil E. Barnes
J. J. Sheehy Jr.

Inventor
Arthur W. Park.
By James Sheehy
Attorney

THE NORRIS PETERS CO., WASHINGTON, D. C.

UNITED STATES PATENT OFFICE.

ARTHUR W. PARK, OF VIOLA, ILLINOIS.

HOG-CATCHER.

No. 867,296.  Specification of Letters Patent.  Patented Oct. 1, 1907.

Application filed May 15, 1907. Serial No. 373,782.

*To all whom it may concern:*

Be it known that I, ARTHUR W. PARK, a citizen of the United States, residing at Viola, in the county of Mercer and State of Illinois, have invented new and useful Improvements in Hog-Catchers, of which the following is a specification.

My invention pertains to hog catchers, and consists in the peculiar and advantageous implement, hereinafter described and claimed for catching hogs of various sizes and securely holding the same while they are being ringed, marked or otherwise operated on.

Figure 1:
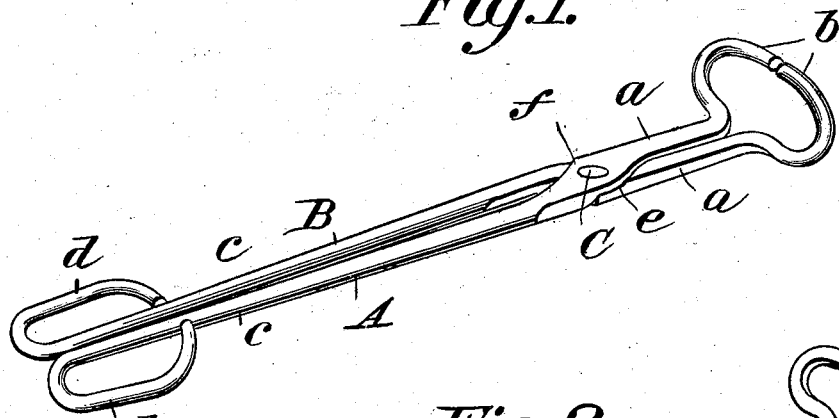
Figure 2:
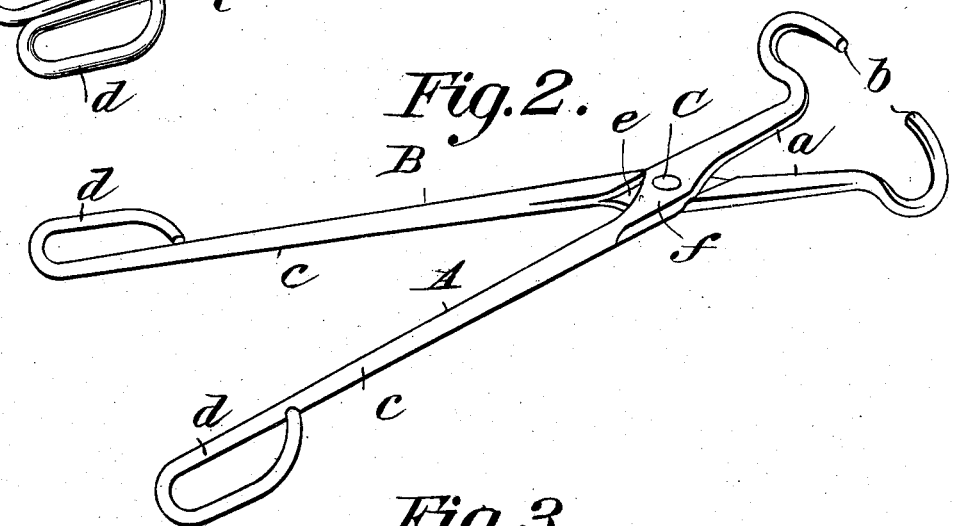
Figure 3:
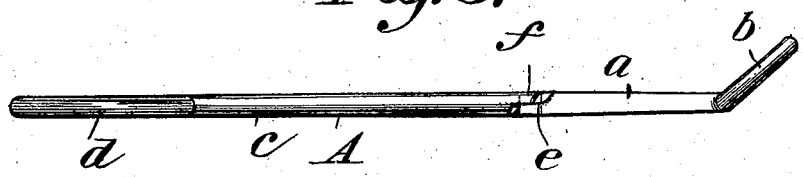
Figure 4:
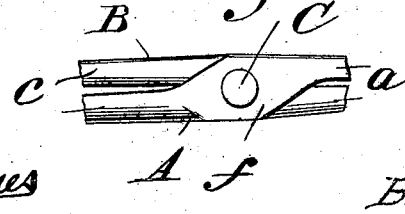

In the accompanying drawings, forming part of this specification: Figure 1 is a perspective view showing my novel hog catcher and holder as closed. Fig. 2 is a similar view of the implement as it appears when open. Fig. 3 is a side elevation of the closed implement. Fig. 4 is an enlarged detail plan view showing the peculiar hinge connection between the members of the implement.

Similar letters of reference designate corresponding parts in all of the views of the drawings.

My novel hog catcher and holder is about twenty-four inches in length, and is made up of two members A and B, preferably of steel, and a pintle C through which the said members A and B are connected in a hinged manner. The members A and B are each formed of one piece, and have forward arms $a$ arranged side by side in the same plane, jaws $b$ of general U-shape which are inclined forward and upward from the forward ends of the arms $a$, Fig. 3, rear arms $c$ arranged side by side and in the same plane, and handles $d$ which are formed by bending the rear portions of the arms $c$ outward, forward and inward, as illustrated. Intermediate the forward arms $a$ and the rear arms $c$, the members A and B have diamond-shaped recesses $e$ and diamond-shaped portions $f$ of increased width and reduced thickness; the portion $f$ of one member being disposed in the recess $e$ of the other, and the two portions $f$ serving to receive the pintle C. By virtue of the said specific hinge connection, it will be seen that when the implement is closed, the forward arms of the members A and B are enabled to rest quite close together as are also the rear arms thereof; and it will also be apparent that the said hinge and the forward and upward inclination of the jaws $b$ permit of the forward portion of the implement being placed in a hog's mouth while the jaws are closed, and also permits of said jaws being opened and closed while in the hog's mouth.

My novel implement is used to catch and hold hogs while the same are being ringed, marked or otherwise treated, and in the use of the implement the operator grasps the outer bars of the handles $d$ and hence is enabled to conveniently hold the implement and manipulate the same to advantage.

Having described my invention, what I claim and desire to secure by Letters-Patent, is:

The herein described hog catcher and holder consisting essentially of the members A and B having straight forward arms arranged in the same plane, U-shaped jaws $b$ inclined upward and forward from the forward ends of said forward arms, and straight rear arms arranged in the same plane with their rear portions bent laterally outward forward and inward to form open handles lying in the same plane as the rear arms, and also having diamond-shaped recesses and diamond-shaped portions, increased in width and reduced in thickness, arranged intermediate the forward and rear arms; the diamond-shaped portion of one member being disposed in the correspondingly shaped recess of the other, and a pintle connecting the said diamond-shaped portion.

In testimony whereof I have hereunto set my hand in presence of two subscribing witnesses.

ARTHUR W. PARK.

Witnesses:
 WALTER MILES,
 J. G. SUMMERS.